United States Patent [19]

Burelbach

[11] Patent Number: 4,478,784
[45] Date of Patent: Oct. 23, 1984

[54] PASSIVE HEAT TRANSFER MEANS FOR NUCLEAR REACTORS

[75] Inventor: James P. Burelbach, Glen Ellyn, Ill.

[73] Assignee: The United States of America as represented by the United States Department of Energy, Washington, D.C.

[21] Appl. No.: 387,113

[22] Filed: Jun. 10, 1982

[51] Int. Cl.$^3$ ............................................. G21C 15/18
[52] U.S. Cl. .................................... 376/298; 376/367; 376/290; 376/287; 165/32
[58] Field of Search ............... 376/298, 299, 367, 171, 376/172, 290, 378, 390, 391, 402; 165/32 H, 32 HV, 104.21

[56] References Cited

U.S. PATENT DOCUMENTS

| | | | |
|---|---|---|---|
| T101204 | 11/1981 | Hampel | 376/221 |
| 3,229,759 | 1/1966 | Grover | 376/367 X |
| 3,302,042 | 1/1967 | Grover et al. | 376/367 X |
| 3,548,931 | 12/1970 | Germer | 376/290 X |
| 3,602,429 | 8/1971 | Levedahl | 165/32 H X |
| 3,668,070 | 6/1972 | Fiebelmann et al. | 376/367 |
| 3,749,156 | 7/1973 | Fletcher et al. | 165/32 H |
| 3,866,424 | 2/1975 | Busey | 376/367 X |
| 3,888,730 | 6/1975 | Jackson . | |
| 4,022,657 | 5/1977 | Lemercier | 376/290 |
| 4,367,195 | 1/1983 | Aubert et al. | 376/367 X |

Primary Examiner—Richard E. Schafer
Assistant Examiner—Daniel Wasil
Attorney, Agent, or Firm—Charles F. Lind; Hugh W. Glenn; Michael F. Esposito

[57] ABSTRACT

An improved passive cooling arrangement is disclosed for maintaining adjacent or related components of a nuclear reactor within specified temperature differences. Specifically, heat pipes are operatively interposed between the components, with the vaporizing section of the heat pipe proximate the hot component operable to cool it and the primary condensing section of the heat pipe proximate the other and cooler component operable to heat it. Each heat pipe further has a secondary condensing section that is located outwardly beyond the reactor confinement and in a secondary heat sink, such as air ambient the containment, that is cooler than the other reactor component. Means such as shrouding normally isolated the secondary condensing section from effective heat transfer with the heat sink, but a sensor responds to overheat conditions of the reactor to open the shrouding, which thereby increases the cooling capacity of the heat pipe. By having many such heat pipes, an emergency passive cooling system is defined that is operative without electrical power.

4 Claims, 5 Drawing Figures

PASSIVE HEAT TRANSFER MEANS FOR NUCLEAR REACTORS

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

BACKGROUND OF THE INVENTION

Generation of electrical power by means of nuclear energy has long been proven feasible; but even so, opposition against such activity is consistent because of varying safety considerations. One issue that opponents of nuclear energy raise is the possible release to atmosphere of radioactivity, such as might occur in an overheating malfunction situation incidental to a coolant blockage, a power excursion, an electrical power failure, or the like. To counteract this opposition, reactor development has established redundant cooling systems to dissipate any build-up of heat in the reactor core. One reactor design would use a primary reactor coolant, such as high pressure water or molten sodium that flows through the core; and a secondary or isolated coolant of water-steam that cools the primary coolant remote from the core. Since only the secondary coolant is expanded through the electrical power generating apparatus, it is relatively free of radioactive contaminants.

Redundant cooling systems mean that the reactor operation can continue or be stopped safely even in the event of a complete failure of one of the cooling systems. However, one limiting factor to a redundant design is its dependence on electrical power, including standby or emergency power; whereupon even a redundant cooling system could fail or become severely degraded if it were the "active" type and required electrical input power.

Another problem associated with reactor design is excessive thermal expansion incurred upon the reactor components being subjected to wide variations of temperatures. In this regard, the reactor might include an open-top tank perhaps 50–80 feet in diameter and within which the reactor core and primary reactor coolant (sodium) would be confined; and a heavy deck to close and seal the open top of the reactor tank. The deck is structural in nature and suspends from it reactor components such as heat exchangers, primary coolant flow pumps, control and safety instruments, and fuel rod control and loading and unloading mechanism. These components are specifically positioned and cooperate with one another within the reactor tank, so that excessive differential thermal expansion of the deck structure can be amplified significantly to cause misalignment of these components or separation of the seals and/or conduits isolating cooling flow between these components.

The deck commonly has been fabricated of vertically-separated upper and lower horizontal deck plates and interconnecting vertical walls between the deck plates. The lower deck plate overlies the primary reactor coolant liquid confined in the vessel at temperatures as high as 600°–1000° F., and is thereby subjected to a significant heat input. The upper deck plate is exposed to ambient air of a reactor containment building; and consequently has a capacity to dissipate heat. Although radiation shielding and thermal insulating materials are supported proximate the underside of the lower deck plate, nonetheless a large temperature difference would exist between the upper and lower deck plates if adequate cooling were not provided.

Conventional deck design attempts to establish and maintain a generally small temperature differential between the upper and lower deck plates. One system provides for circulating coolant through appropriate coolant passages formed in the deck structure. The coolant has been either a gas such as air or nitrogen, or a liquid such as water. This approach, however, requires an active source, typically electric pump means, to force the coolant through the passages. Consequently, under an electric power failure design comparison, the cooling capacity drops off dramatically to produce excessive temperature differences between the upper and lower plates. Inasmuch as the upper and lower deck plates are normally separated from one another by, for example 10 or 12 feet, any temperature differentials beyond a designed amount can cause significant thermal movement between the deck plates and misalignment of the components supported by the deck.

A passive dual concept design variation provides for convective flow of coolant through the deck structure. This is not totally satisfactory since this design generally has required draft chimneys to assure adequate cooling and moreover, the hollow deck design must be open to the atmosphere. This is contrary to a preferred design concept that confines the deck coolant within a sealed hollow deck structure.

SUMMARY OF THE INVENTION

This invention relates to an improved passive arrangement maintaining adjacent or related components of a nuclear reactor within specified temperature differences even without the use of electrical power.

This invention specifically provides for passive cooling means that are interconnected operatively between related components of a power reactor in order to maintain these components within design temperature differences by cooling one component while heating the other component, the cooling means being operative solely with thermal transfer and without electrical power.

A specific object of this invention is to provide for use in a reactor improved passive cooling means in the form of heat pipes located about the reactor, each heat pipe having a vaporizing section operatively associated with one reactor component that is to be cooled and a primary condensing section operatively associated with a second reactor component that is to be heated, thereby providing for thermal transfer and temperature equalization between these components.

A more specific object of this invention is to provide passive cooling means in the form of heat pipes, each heat pipe further having a secondary condensing section that is located outwardly beyond the reactor confinement tank and that projects into a secondary heat sink, such as ambient air formed within a containment building for the reactor itself, so as to provide for additional cooling capacity of the reactor components during overheat or emergency conditions, including operation without electrical power where all other modes of cooling might be inoperative.

DETAILED DESCRIPTION OF THE INVENTION

Figure 1:
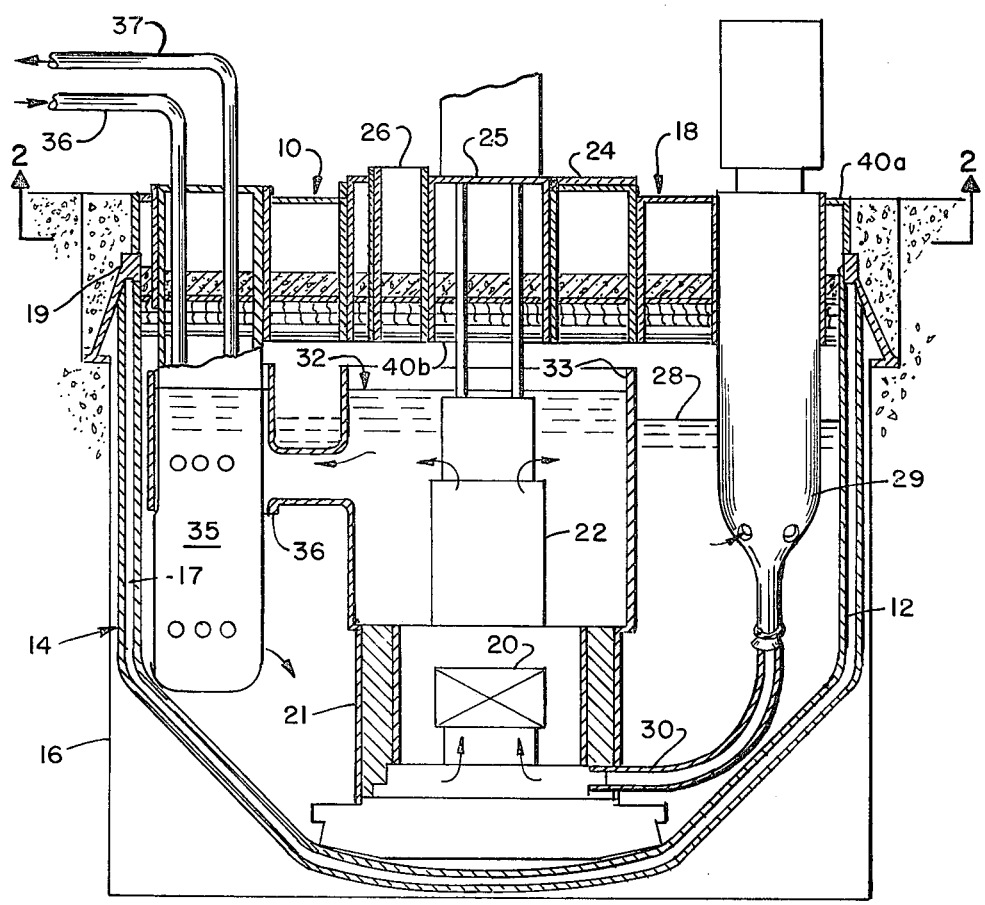
FIG. 1 is an elevational view, partly in section as seen from line 1—1 in FIG. 2, of a nuclear reactor showing a preferred embodiment of the subject invention.

Referring now to the drawings, a reactor 10 is illustrated schematically, it being housed within a larger containment building (not shown). The reactor 10 itself has an open top vessel or tank 12 which is enclosed on its sides and bottom within a guard vessel or tank 14 and shielding such as concrete walls 16. Preferably the cavity 17 located between the reactor vessel 12 and guard vessel 14 is sealed and filled with an inert gas, such as argon or helium, which could be monitored for leakage from reactor vessel 12. A deck 18 closes the vessel 12 at its open top and seals 19 maintain the vessel pressure-tight.

Located within the vessel is a reactor core 20 surrounded by a radiation shield 21. The core can take any known form but generally would include a plurality of vertical passages (not shown) within which appropriate quantities of fuel and blanket materials are located. Upper internal structure 22 is located above the core and has sensors (not shown) to detect parameters of interest, such as the temperature of the primary coolant, and leads from the sensors are directed to monitor equipment (not shown) outside of the reactor vessel. The structure 22 also includes control linkages or mechanisms (not shown) for regulating the reactor power within the core.

All of this internal structure 22 is suspended from the deck, and lines up vertically with the reactor core. One conventional means for supporting and aligning these components relative to the reactor core provides for three rotatable plugs of different sizes, the largest plug 24 being rotatable within the deck concentrically of the core, the intermediate plug 25 being rotatable within the largest plug 24 offset from its center, and the smallest plug 26 being rotatable in the intermediate plug 25 again offset from its center. Fuel loading and unloading mechanism (not shown) is carried by the smallest plug 26 as at circle 27 offset from its center so that rotation of the three plugs according to predetermined orientations can move it into precise vertical alignment over any of the reactor passages for loading and unloading and/or manipulation of the fuel relative to that passage.

The reaction of the fuel generates heat, and the core 20 is cooled by a circulating primary coolant, typically molten sodium, which substantially fills the tank 12. Specifically, the primary coolant is circulated from a "cold pool" 28 within the vessel through pump 29 and line 30 upwardly through the core 20 to a "hot pool" 32 confined within irregularly shaped continuous wall structure 33 to inlet into one side of a primary heat exchanger 35. The primary coolant then flows through the heat exchanger back to the cold pool 28. Sliding seals 36 are located between the wall structure 33 and the heat exchanger 35 to separate the hot pool 32 from the cold pool 28 while yet allowing some thermal movement of the structural components. An intermediate coolant is circulated through the other side of the primary heat exchanger 35 (in heat conductive but fluid isolated relation relative to the primary coolant) via inlet and outlet lines 36 and 37 and a closed intermediate cooling loop (not shown) including a pump and an intermediate heat exchanger located outside the reactor vessel 12. The intermediate coolant would preferably be molten sodium also. A secondary coolant, generally water, would be circulated through the secondary heat exchanger (in heat conductive but fluid isolated relation relative to the intermediate coolant) in a closed secondary steamwater cooling loop with a power turbine (not shown) forming part of a conventional electrical power generating system. The secondary coolant is thereby essentially free of radioactive contaminants to minimize the risk of radioactive spill should any of the secondary coolant components in the steam-water loop fail and leakage occur.

While reference has been made to the primary heat exchanger and other related cooling components only in the singular, most typically there would be several such primary heat exchangers and pumps, etc. located in the reactor vessel which would define parallel coolant loops to the steam utilizing turbine. Construction details need not be given since they form no part of the subject invention and are of conventional well known means.

As noted above the deck 18 spans the open top of the vessel 12 and is structural in nature in that it suspends from it various reactor components including the primary coolant pumps 29 and heat exchangers 35, the rotary plugs 24, 25, 26 and the upper internal structure 22. The reactor vessel 12 can be in excess of 75 feet across its open top and the deck 18 is of corresponding size. It is yet desirable to form the deck 18 from conventional materials that are reasonably economical and easy to fabricate, while yet satisfying safety and structural requirements including thermal deflections and alignment requirements.

Figure 2:
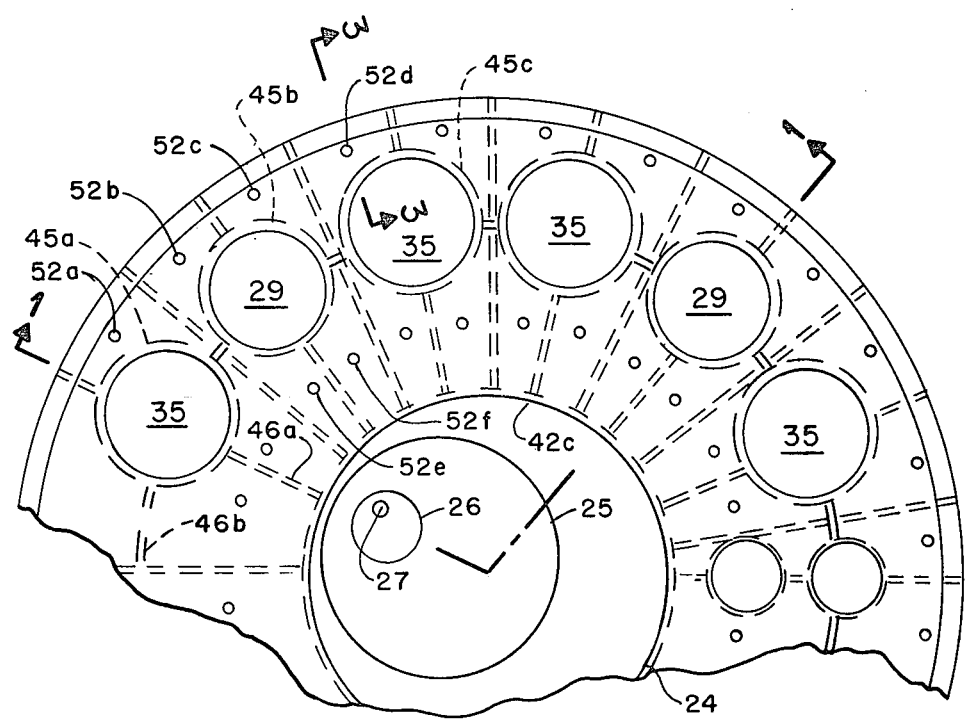
FIG. 2 is a top plan view, again partly in section as seen from line 2—2 in FIG. 1.
Figure 3:
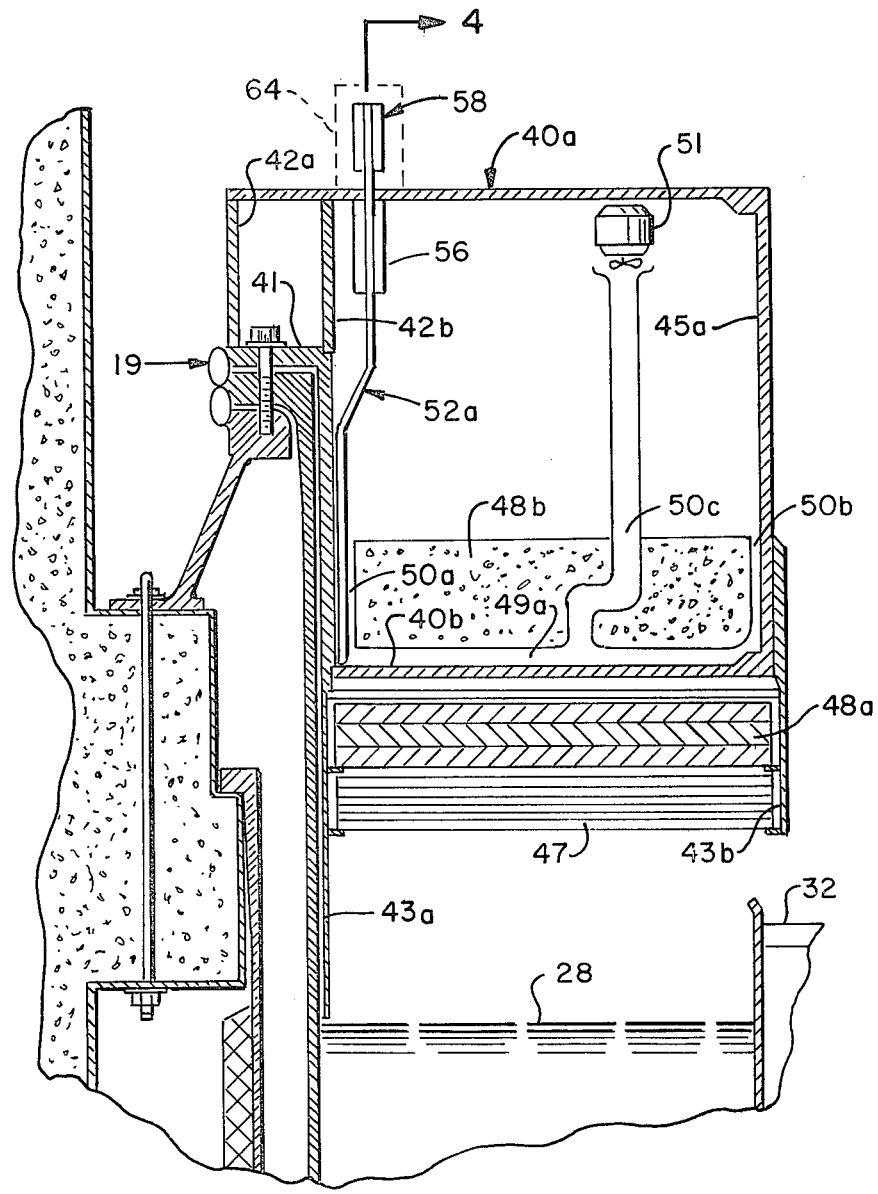
FIG. 3 is an enlarged elevational view, partly in section as seen generally from line 3—3 in FIG. 2, of the improved cooling means incorporated in the reactor illustrated herein.

The deck 18 (see FIGS. 2 and 3) typically has spaced upper and lower main horizontal plates 40a and 40b, flange plate 41, vertical plates 42a, 42b, etc., 43a, 43b, etc., and 45a, 45b, etc., and webs 46a, 46b, etc. In a preferred embodiment, the deck plates or webs are formed of structural plate material, such as steel, and are welded or otherwise secured relative to one another across continuous leak-proof seams so as to define a hollow but otherwise sealed unitary deck structure. With the main plates 40a and 40b and the vertical cylindrically shaped plates 45a and 45b welded together, the physical component like the heat exchangers 35 or pumps 29 can extend through and be supported by the deck. Reinforcing webs 46a and 46b can be welded in place at specific locations as needed. Thermal insulating barriers 47 of steel meshing and steel sheeting moreover are supported by walls 43a and 43b proximate the underside of the lower deck plate 40b, and radioactivity shielding 48b of ironized concrete is carried by the deck proximate the upper side of the lower deck plate.

The deck 18 is exposed on its underside to the various "hot" and "cold" pools of primary coolant confined within the vessel 12. For example, the "cold" pool would typically be at temperatures in excess of 500° F.

and possibly up to 700° F.; whereas the hot pool would typically be at temperatures in excess of 800° F. and possibly up to 1000° F. The upper deck plate 40*a* would typically be exposed to ambient air, possibly at 65°-85° F., in the confinement building.

A preferred design for the deck structure provides that the lower deck plate 40*b* would be operated at temperatures less than 250° F. and preferably even as low as 150° F., while the upper deck plate 40*a* would be operated at temperatures less than 150° F. and possibly even as low as 100° F. This design temperature differential of 50° to 150° F. between the upper and lower deck plates, after once established, would thereafter have to be maintained. Otherwise, temperature differences exceeding this could cause thermal deflections which could be magnified between the components supported from the deck to create misalignment of these components, disruption of the seals between the components, or other problems.

A conventional concept for cooling the deck structure has been by circulating a coolant, such as air, nitrogen, or water, within or through the deck structure. The deck would thus have many crosswise or radial passages 49 located immediately adjacent the lower deck plate and vertical passages 50 extended between and connecting these passages as coolant loops. For forced coolant circulation within the deck structure, a motor driver blower 51 is provided. The forced coolant circulation easily maintains the design temperature differential between the upper and lower deck plates. However, should the blower power source, viz., the conventional AC electrical power, standby power, or battery power be discontinued, the forced coolant circulation through the passages would cease and the design temperature differential between the upper and lower deck walls would be exceeded.

Convective cooling is a possible "passive" system for use in emergency conditions, "passive" meaning that no input power is required to operate the system. The convective cooling system typically would use air as a cooling means and would have inlet and outlet passages (not shown) through the concrete barrier (with angled bends to eliminate radiation streaming from the reactor). However, convective cooling is not an attractive alternative by itself as it has low capacity and moreover requires that the deck structure be open to the atmosphere, and not sealed.

This invention teaches an improved "passive" cooling means for maintaining the upper and lower deck plates within design temperature differences. The cooling means could act along or in parallel with conventional forced coolant circulating means; however, the disclosed cooling means can be designed to have adequate cooling capacity to meet most operating conditions. The subject invention thus provides thermal stability for the deck and positional stability of any reactor components carried by the deck.

The invention utilizes a plurality of heat pipes 52*a*, 52*b*, 52*c*, etc., each of which has a vaporizing section 54 located to receive heat from the lower deck wall 40*b*, a primary condensing section 56 located to dissipate heat to the upper deck plate 40*a*, and a secondary condensing section 58 located beyond the upper deck plate and outside of the deck 18 itself to dissipate heat to the atmospheric air in the containment building. The secondary cooling section 58 could be made to be effective in only off-normal or emergency operating conditions, as will be disclosed.

Each heat pipe 52 consists of a housing 60 of stainless steel, for example, having a coolant sealed therein. The coolant would be selected to vaporize at the input temperatures of the vaporizing section 54 and would condense at the output temperatures of the condensing sections 56 and 58. A coolant in the form of water or alcohol could be used for the range of operating temperature under consideration. A wick 62 would cover the inner walls of the housing 60, the wick being preferably formed of a meshed network of stainless steel having many very small pores or openings of the order of 100-150 mesh. Heat added to the heat pipe vaporizing section 54 would vaporize the liquid coolant therein which vapor would then flow axially along the center space toward the primary and secondary condensing sections 56 and 58 respectively. The primary condensing section 56, in heat dissipating relation to the upper deck wall 40, normally would condense the coolant vapors onto the wick 62. The coolant then would migrate by capillary action, and also gravity, depending on its orientation along the wick 62 from the condensing section 56 to the vaporizing section 54. The heat pipe 52 would be designed to operate within the input and output range of temperatures so that coolant condensate will always move via the wick 62 to the vaporizing section 54, and coolant vapor would move interiorally of the housing 60 to the condensing section 56 or 58; and under stabilized operating conditions, this coolant circulation would be continuous. Because vaporization and condensation are each involved in the action of the coolant in the pipe, the heat transferring capacity of the heat pipe 52 is very large, possibly 50-500 times greater than a solid copper pipe for example. However, the heat pipe 52 is yet entirely passive and requires no input electrical power.

The secondary condensing section 58 is located outside of the deck 18 in the building atmosphere. However, it is housed within a small enclosure 64 having open sides, and damper doors 66 would normally close the open sides of the enclosure to isolate the condensing section from the air of the containment building. However, when the damper doors 66 are opened, air flow through the enclosure 64 is possible over the secondary condensation section 58. Fins 68 can be on the secondary condensing section 58 to provide good heat transfer with the ambient air. Each damper door 66 can be shifted between its closed and opened positions by means of a bimetal activator 70, which in a preferred embodiment would be exposed to the upper deck plate 40*a* to be responsive to the temperature of the deck plate.

Under normal reactor operation, the temperature differential between the vaporizing section 54 and primary condensing section 56 of the heat pipe would be designed to be of the order of 50°-150° F. and the heat transferring capacities of the heat pipes could be sufficient to maintain the deck plates within this specified temperature differential. However, if the heat pipes are to be used only as a redundant or parallel system with the forced coolant circulation in the deck structure, the design capacity could be less. The anticipated heat withdrawn by the heat pipe system under normal reactor operation could typically only comprise 10-25% of the total deck cooling, and the forced coolant circulation would provide the balance.

Upon a breakdown of the normal forced coolant circulation system, such as during a power failure, the design temperature differential between the upper and lower deck plates would be exceeded. This increase in the temperature of the deck would be sensed by the bimetal activator 70 to open the damper doors 66 to expose the secondary condensing section fins 68 to the air within the containment building. The building would be conditioned, so that the air temperature would be controlled and similar to normal atmospheric temperature of 65°-85° F.

The secondary condensing section 58 greatly increases the cooling capacity of the heat pipe 52, although this extra capacity is used primarily for emergency only. Nonetheless, it might be possible to design the heat pipe system with sufficient overall capacity to act as the sole heat dissipating means for cooling the lower deck plate 40b and without any forced coolant circulating means in the deck. However, when acting as either the sole or as the redundant cooling means, the secondary condensing sections 58 of the heat pipes preferably would be isolated and inactive. Thus, the enclosures surround the heat pipes, and with the damper doors 66 closed during normal reactor operation, even though coolant vapor can pass into the secondary condensing section 58, little vapor condensation will take place with the doors closed as there is little or no air circulation to carry the heat away. However, the dissipating capacity of the heat pipes through the primary condensing sections and the upper deck plate 40a will be sufficient to maintain the operating temperatures balanced.

It would be possible to modify each heat pipe somewhat by interposing thermally controlled valve means internally of the pipe housing at a location between the primary and secondary condensing sections. At normal operating temperatures, the valve means will be closed to isolate the secondary condensing section from the primary condensing section; whereas at elevated "emergency" temperatures, the valve means would be opened to allow coolant circulation to the secondary condensing section.

Each heat pipe 52 further is designated to be removed periodically for inspection and/or maintenance, particularly as regards the integrity of the pressure confinement housing 60. Thus, separate heat conductive clamping sleeves 74 and 76 would fit over the respective vaporizing and primary condensing sections 54 and 56 of the heat pipe and would be secured also the the lower deck plate 40b and the upper deck plate 40a. This not only establishes good heat conductivity between the deck plates 40a and 40b and the heat pipe itself but also allows for the ready removal of the heat pipe. Generally, each sleeve 74, 76, preferably would extend one and possibly two feet axially along the heat pipe 52.

A heat pipe 52 with a diameter of approximately an inch, for example, containing water at pressures of approximately 3 psia and working at a temperature of 140° F. would have approximately one kilowatt of heat removing capacity. For a nuclear reactor having a diameter of 70 ft, for example, one hundred such heat pipes 52a, 52b, etc., distributed around the deck 18 would provide approximately 100 kilowatts of cooling capacity.

The subject heat pipe cooling system can be used with minimal interferences with and/or without special designs of other components that would extend through or be part of the deck 18. This differs substantially from the typical forced coolant circulating system which requires many special interior and exterior ducts, exterior heat exchangers, as well as powered blowers. It thus might be possible to utilize the heat pipe cooling system on existing reactors as retrofit modification of the reactor cooling systems. Moreover, since each heat pipe wick 62 operates on a capillary principle, the heat pipe 52 need not be oriented vertically, but could run at an angle or even horizontally.

The disclosed heat pipe cooling means can be used to cool reactor components other than the deck configuration as illustrated. For example, the heat pipe vaporizing section can be secured in heat transfer relation relative with the guard vessel 14 or to the cavity 17 between the reactor vessel 12 and the guard vessel. The condensing section can be exposed to a heat sink outside of and isolated from the vessel. A control including a temperature responsive mechanism, for example, could be used to regulate the cooling effectiveness of the heat pipe. Under normal operating reactor conditions and temperatures, little cooling would take place via the heat pipe; but above normal reactor temperatures would make the heat pipe more operative in the effort to remove such excess heat; thereby tending to avoid the adverse consequences of abnormal reactor temperatures and/or malfunctioning conditions.

Figure 4:
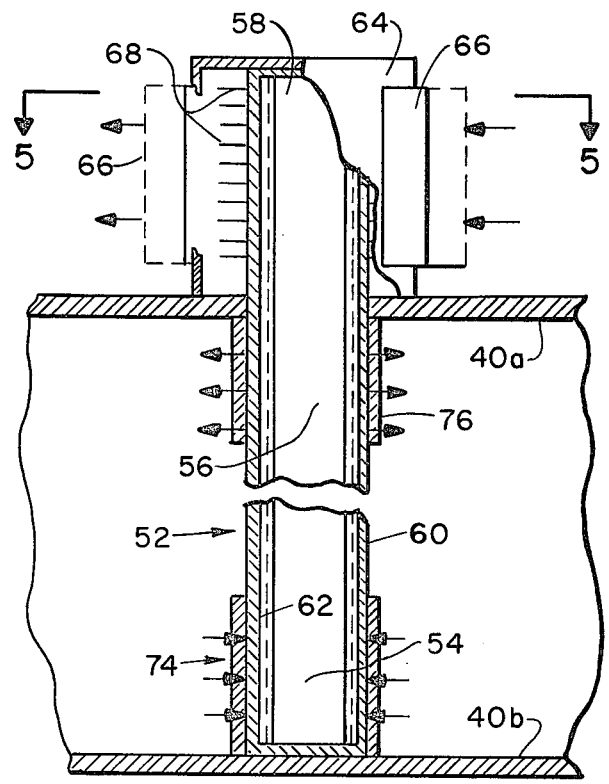
FIG. 4 is an enlarged sectional view, as seen from line 4—4 in FIG. 3.
Figure 5:
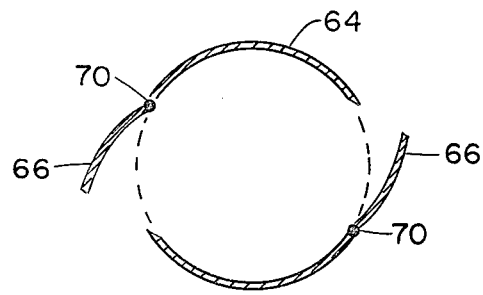
FIG. 5 is a top plan view, again partly in section as seen from line 5—5 in FIG. 4.

The heat pipe cooling means further could be designed with secondary condensing section, much like that illustrated in FIGS. 4 and 5, exposed to the same heat sink or a secondary heat sink only upon overheat situations. This would provide a redundant emergency reactor cooling system, operable passively and without the need for any secondary power.

Accordingly, the invention is to be limited in scope only by the appended claims, and not by the actual specific disclosure illustrated.

The embodiments of the invention in which an exclusive property or privilege is claimed are defined as follows:

1. In a nuclear reactor having components operative to generate reaction heat, means to utilize the reaction heat, and spaced structures including a vessel and a deck for enclosing and isolating the reactor components from a cooler external heat sink, the improved combination therewith of a plurality of heat pipes each having a vaporizing section and a pair of condensing sections, each vaporizing section being disposed in heat transfer relation with one of such structures and one of the pairs of condensing section being in heat transfer relation with another of the structures spaced from the one structure while the other of the condensing sections being in heat transfer relation with the external heat sink, each heat pipe having an exterior housing sealed closed and wick means disposed on the inner faces of the heat pipe housing and a coolant sealed within the heat pipe housing, said coolant being at pressures within the heat pipe housing for vaporizing at the operating temperatures intended for the one structure and for condensing at the operating temperatures of the other structure and of the heat sink, whereby heat is passively transferred via each heat pipe from the one structure to the spaced structure and to the heat sink, enclosure means for normally reducing the effective heat transfer of said other condensing section relative to the heat sink, and means for venting the enclosure means responsive to operating conditions where the one structure approaches the upper limit of and overheats relative to its range of operating temperatures, whereupon the other condensing section becomes operative to provide additional cooling capacity for the heat pipe thereby tending to maintain the structures in the intended range of operating temperatures.

2. A nuclear reactor combination according to claim 1, wherein said condensing sections and said vaporizing section in each heat pipe are in continuous heat transfer relation with one another via the heat pipe, and wherein said one condensing section is disposed between the vaporizing section and the other condensing section, whereby heat pipe is effective to continuously transfer heat from the vaporizing section to the one condensing section for maintaining the respective temperatures of each within the intending operating range and whereby each other condensing section serves mainly to prevent overheating when the overall temperatures increases.

3. In a nuclear reactor, the combination of an open top vessel for confining liquid coolant, deck structure supported at its periphery relative to the open top of the vessel for closing and sealing the vessel, reactor components suspended from the deck structure and extended into the vessel, the deck being formed of separate lower and upper horizontal walls and reinforcing vertical walls between the lower and upper walls, a plurality of heat pipes each having a vaporizing section and one condensing section disposed in heat transfer relation respectively, with the lower and upper deck walls, whereby heat is transferred from the lower deck wall to the upper deck wall for maintaining the deck walls generally within a range of specific design temperatures, wherein each heat pipe further has another condensing section outside of the vessel spaced from the upper deck wall and exposed to a heat sink of air outside of and ambient the deck structure, and means normally minimizing the effective heat transfer of the other condensing section relative to the heat sink in all operating conditions except under reactor overheat conditions, whereupon the other condensing section becomes operative to add additional cooling capacity to each heat pipe.

4. A nuclear reactor combination according to claim 3, wherein the minimizing means is in the form of an enclosure over the other condensing section operable to isolate it from the heat sink, vent openings in the enclosure operable to allow effective heat transfer between the other condensing section and the heat sink, and means normally closing the vent means and for opening the vent means responsive to the reactor approaching and exceeding the upper limits of the range of design temperatures.

* * * * *